United States Patent [19]
Schukei

[11] 3,871,176
[45] Mar. 18, 1975

[54] LARGE SODIUM VALVE ACTUATOR

[75] Inventor: Glen Elwin Schukei, South Windsor, Conn.

[73] Assignee: Combustion Engineering, Inc., Windsor, Conn.

[22] Filed: Mar. 8, 1973

[21] Appl. No.: 339,256

[52] U.S. Cl. ............... 60/326, 60/364, 251/59, 308/9, 310/11, 417/50
[51] Int. Cl. ............................................. F16k 31/12
[58] Field of Search ............... 60/326, 364; 417/50; 310/11; 308/9; 251/59

[56] References Cited
UNITED STATES PATENTS

| | | | |
|---|---|---|---|
| 2,616,448 | 11/1952 | Werey | 251/59 X |
| 2,645,136 | 7/1953 | Neal | 60/364 X |
| 2,658,452 | 11/1953 | Donelian | 417/50 |
| 2,730,951 | 1/1956 | Donelian | 310/11 X |
| 2,934,900 | 5/1960 | Robinson | 60/326 X |
| 3,540,783 | 11/1970 | Cudnohufski | 308/9 |
| 3,704,853 | 12/1972 | Waller | 251/59 |

Primary Examiner—Edgar W. Geoghegan
Assistant Examiner—William F. Woods
Attorney, Agent, or Firm—Stephen L. Borst

[57] ABSTRACT

A large valve actuator assembly driven by an electrically conducting liquid enclosed in a hermetically sealed housing. The conducting liquid contained within the housing is circulated by electromagnetic forces without housing penetrations. The circular flow of the liquid impinges on a vane structure causing it to rotate. The vane structure's rotation is mechanically translated from a rotary to a linear motion for valve stem actuation. The electromagnetic forces operate on principles of electromagnetic induction similar to those found in the operation of an electric motor. A circularly advancing magnetic field is imposed on the electrically conducting liquid. Magnetic coupling between the liquid and the advancing field cause the liquid to rotate and in so doing impart rotation to the vane structure.

6 Claims, 3 Drawing Figures

LARGE SODIUM VALVE ACTUATOR

BACKGROUND OF THE INVENTION

1. Field of the Invention

This invention relates to the generation of a mechanical displacement by an actuation mechanism which relies on the pumping characteristics of a liquid metal electromagnetic pump. More specifically, this invention may be used as a large valve actuator in a liquid sodium carrying system.

By "electromagnetic pump" or "electromagnetic pumping means" is meant a pump which incorporates the magnetic field of an electromagnet as the means by which the liquid metal is driven. The general theory relied on for the operation of the liquid metal electromagnetic pump may be found in U.S. Pat. No. 2,865,291 issued Dec. 23, 1958 to D. A. Watt entitled "Pumps for Liquid Current-Conducting Material," the disclosure of which is incorporated herein by reference. In particular, reference should be made to paragraphs 1, 2 and 3 of column 1 and the first complete paragraph of column 3 of the referenced patent.

In the present invention a wave of magnetic field penetrates across and advances around the periphery of a disk of liquid metal. The magnetic field induces an instantaneous eddy current in the liquid metal in each position around the disk. The eddy current generates its own magnetic field which becomes magnetically coupled with the advancing field. Consequently, the magnetic coupling between the eddy current magnetic field and the advancing magnetic field drags the liquid around with the advancing magnetic field.

2. Description of the Prior Art

Linear motion with high forces within a liquid metal environment has heretofore been difficult to accomplish and is especially fraught with problems. This is particularly true for actuation of large valves used in liquid sodium systems incorporated in cooling nuclear reactors. In the reactor coolant context the traditional difficulties are aggravated and made more critical by the fact that the liquid sodium becomes radioactive. In addition to the radioactivity, the high temperatures and high corrosiveness of liquid sodium present the major difficulties. Also of concern is the fact that liquid sodium oxidizes explosively when allowed to come into contact with water and will burn when in contact with air. Standard means of valve sealing such as are used on valves that handle water are not acceptable since the liquid metal attacks all known packing materials. Therefore, an urgent need is felt to develop ways of handling liquid sodium which minimize the possibility of leakage from the liquid metal system.

In the prior art two systems of valve actuation have been commonly used. The first incorporates a system which provides a thin annulus of sodium between the valve stem and valve body. The area where this annulus is located is then cooled below the solidification point of the sodium (208°F) and the solid annulus becomes the valve packing. The major disadvantages of this system are that oxides of the sodium migrate to this cold area and form a very abrasive and solid joint which soon requires very large forces to shear the solid joint. The movement of the valve stem across the abrasive sodium oxide also causes damage to the valve stem. In addition, if coolant is lost the annulus soon heats up to the point where the solid sodium melts and leakage from the system results. In a liquid sodium coolant system any leakage is unacceptable due to sodium's high corrosibility, radioactivity and its tendency to burn when in contact with air. The high temperatures (approaching 1,300°F or 685°C) add to the leakage problem since the pyrophoric qualities of sodium increase in direct relation to the temperature.

The second approach that is found in the prior art for valve actuation in a liquid metal system is a bellows arrangement. This approach is acceptable for small valves (valves with a maximum diameter of 2 inches), but becomes unacceptable for the large valves found in the reactor coolant circulation system (approaching twenty inches). An example of such a small bellows valve actuator is to be found in U.S. Pat. No. 2,948,118 entitled "Electromagnetic Pump Actuated Device." The bellows devices rely on thin membranes that must undergo considerable amounts of back and forth flexing. These thin flexing members are susceptible to fatigue and rupture causing leakage of the system's liquid. For the larger size valves, a considerable distance of travel is required and due to the large forces encountered, large diameters are required for the valve stems. Due to the large diameters, thicker bellows materials are required to withstand the pressure and very long stacks of bellows would be required to accommodate the motion without excessive stressing of the bellows materials.

In the liquid sodium system, certain impurities form and migrate to the cooler parts of the system. Ordinarily the bellows type valve actuator will be contained in a housing off to the side of the main flow of the system. The result is that the valve actuator runs at a lower temperature and sodium impurity concentration occurs. The concentrated impurities in the sodium tend to attack and embrittle the metallic components of the valve actuator further increasing the possibility of rupture of the thin membrane of the bellows.

SUMMARY OF THE INVENTION

This invention consists of an actuation means to be employed in an electrically conducting liquid environment. More specifically, the invention may be used as a valve actuator for controlling the positioning of a valve head in a hermetically sealed liquid metal system. A ball nut stem is reciprocated by a ball nut which in turn is attached to a disk which is caused to rotate by a system of vanes attached to the disk and suspended in the electrically conducting liquid. The valve stem, the ball nut, the valve structure and the electrically conducting liquid, which is the same as the liquid metal flowing in the regulated system, are all enclosed in a hermetically sealed housing. The driving force necessary to actuate this system is provided by electromagnets whose magnetic poles are all external to the sealed housing and which produce a rotating flux field in the electrically conducting liquid.

In this invention the vane assembly is planar so that rotation of the vane assembly describes a disk. Enclosing the vane assembly is a hollow disk-shaped housing. The liquid is driven by an advancing wave of magnetic flux produced by a multitude of AC activated polyphase wound electromagnets spaced around the periphery of the housing disk. These multiphase electromagnets are activated in such a way as to generate a traveling magnetic field which advances in one direction around the disk. Means are provided for reversing the phasing so that the traveling magnetic field can be made to advance around the disk in the opposite direction. Eddy currents in the liquid are induced by the advancing magnetic flux and the eddy currents in turn establish their own fields. The eddy current fields become linked with the advancing magnetic field so that the electrically conducting liquid is dragged around the disk in an attempt to follow the advancing flux, creating a circular flow of the liquid. The resultant force on the vanes causes rotation of the vane assembly and the desired disk and ball screw rotation is achieved.

DESCRIPTION OF THE PREFERRED EMBODIMENT

Figure 1:
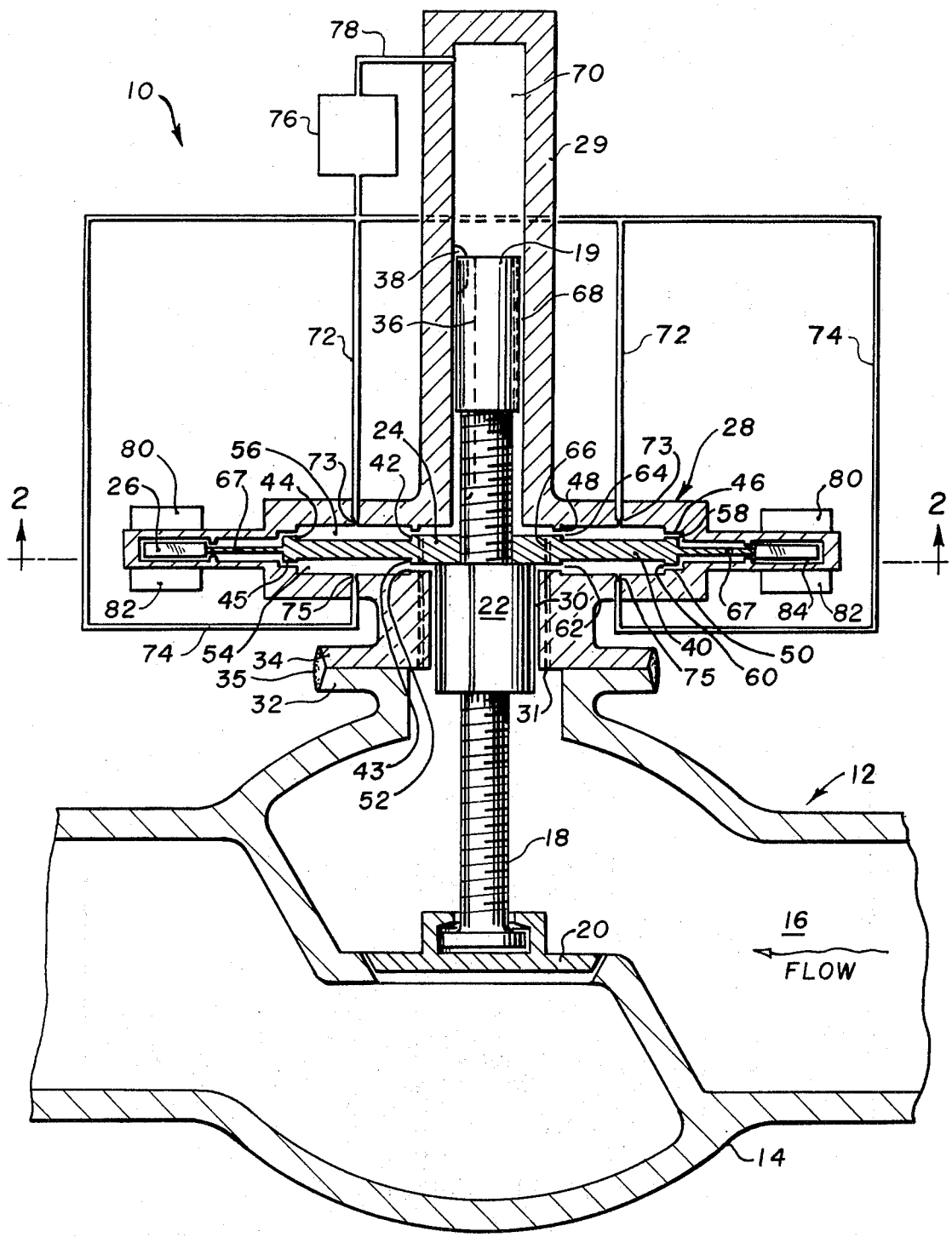
FIG. 1 is a cross-sectional diagram of a valve and valve actuator as described in the preferred embodiment.
Figure 2:
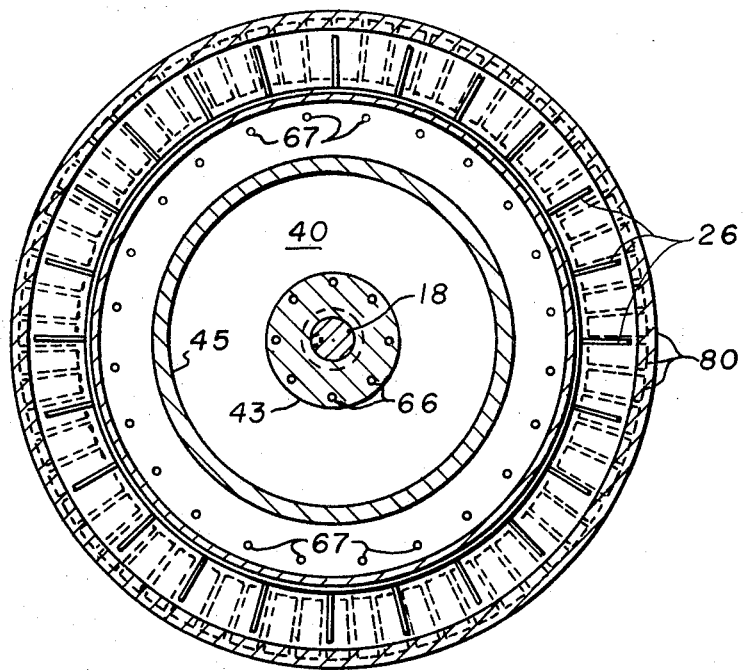
FIG. 2 is a view of the valve actuator's vane and magnet layout taken along the view lines 2—2 of FIG. 1.

This invention consists of an actuator assembly 10 as shown in FIG. 1. While the invention is particularly suited to valve actuation in a liquid sodium system, it is not intended herein that the scope of the invention be limited to use only with valve actuation in a liquid sodium system. It will be evident that the advantages of the invention have broad application to many other electrically conducting liquids and electrically conducting liquid handling systems wherever a reciprocating or rotating mechanism is desired.

In FIG. 1 the liquid handling system 12 contains a standard stainless steel valve body 14 through which the electrically conducting liquid 16 flows. The valve is operated by a ball screw shaft 18 which is substituted in place of the stem of the standard valve and which is attached to the valve disk 20 by a means well known in the art. This shaft is restrained from rotating by an appropriate slidable means such as a key groove 36 and a key 38. A permanent magnet 19 is positioned on the top of the shaft to enable the determination of valve position through a housing 28. As one example of a power delivery means, the shaft 18 is threaded through a low friction ball screw nut 22 which in turn is fastened to a disk 24. This disk 24 will be later referred to as the hydrostatic bearing disk since it provides the surfaces (lands and depressions) when acting in cooperation with the housing 28 necessary for a hydrostatic bearing. At spaced intervals around the periphery of the disk 24 vanes 26 are attached to the disk and lead radially outward. Also at spaced intervals around the disk are sets of orifices 66 and 67 for allowing the passage of fluid through the disk. As an alternative arrangement, the ball nut screw 22 may be rotationally and axially restrained and the disk 24 may impart its rotary motion to shaft 18 by an appropriate means such as a groove in the shaft and a key on the rotatable disk. This arrangement would allow rotation and translation of the shaft 18, and the ball nut screw 22 would transform the shaft's rotation into axial translation.

The entire vane assembly is enclosed in a housing 28 which takes the shape of a hollow disk with a hollow axial spindle 29 allowing axial movement of the shaft 18 with a small clearance between shaft 18 and the spindle housing 29. A passage 68 is provided to allow communication of the liquid sodium into and out of fluid cavity 70. The housing 28 also has an opening 30 which allows the passage of the shaft 18. An additional opening 31 allows passage of the liquid 16 into and out of the housing from the system 12. By this means the housing may be completely filled with the electrically conducting liquid 16 of the system 12. By providing a passage through the openings 31 and 68, the electrically conducting liquid 16 is allowed to continuously circulate through the housing 28 and thereby prevent the accumulation of impurities that have a tendency to migrate to the cooler parts of the system 12. An additional desirable feature is that the valve actuator 10 may be oriented in any direction. In fact the entire valve body 14 and actuator assembly 10 may be mounted in the system 12 in such a way that the actuator assembly points down so that the housing 28 is self-venting and the accumulation of gases is prevented.

The housing 28 is attached to a flange 32 of the valve body 14 (from which the standard valve bonnet has been removed) by flange 34 formed at the base of housing 28. The surfaces of flanges 32 and 34 are sealed by welding 35 to insure a hermetically tight seal, thus completing a hermetically sealed unit which includes the housing 28, the valve body 14, and the fluid carrying system 12. In forming a hermetically sealed unit, one of the main objects of this invention is accomplished. All packing glands and bearing seals which are susceptible to leakage are eliminated thereby eliminating the leakage problem which it is so desirable to avoid in the liquid sodium system.

On the interior of the housing the disk 24 is rotatably mounted by a self-balancing hydrostatic bearing 40. The bearing consists of lower and upper hydraulic cavities 54 and 56 formed by the disk 24 on the interior with raised inside circular races 42 and 43 on opposite sides of the disk and raised outside circular races 44 and 45 on opposite sides of the disk adjacent to and aligned with companion circular races 46, 48, 50 and 52 formed in the housing 28. The thickness of the hydrostatic bearing disk 24 is such that small gaps or orifices 58, 60, 62 and 64 are left between the races 42, 43, 44 and 45 of the disk 24 and the races 46, 48, 50 and 52 of the housing 28. By these gaps 58, 60, 62 and 64, positioned at the ends of the upper and lower hydraulic cavities 54 and 56, the lower and upper hydraulic cavities communicate with the fluid of the system and with other liquid cavities 84 and 70 by means of holes 68, 66 and 31.

The hydraulic fluid cavities 54 and 56 are fed pressurized liquid sodium from an external electromagnetic pump 76 through supply tubes 72 and 74 which have restricted orifices 73 and 75. The electromagnetic pump received its supply of liquid sodium from one end of the liquid cavity 70 which can continuously replenish itself with liquid from the liquid sodium system 12 via passages 31, 66 and 68. The pump 76 may additionally have the characteristic of being able to be pulsed to facilitate the "start up" of the actuator 10. When the electromagnetic pump 76 is in operation, the disk 24 is caused to "float" in an equilibrium by the adjustment of pressures in cavities 54 and 56. If the disk moves away from the equilibrium position towards cavity 54, thus narrowing cavity 54, the orifices 60 and 62 are narrowed and the orifices 58 and 64 are widened. The widening of orifices 58 and 64 reduces the restriction of the flow out of cavity 56. The uncreased flow out of cavity 56 and the widening of cavity 56 with a fixed inlet flow tends to reduce the pressure in cavity 56. At the same time, by narrowing orifices 60 and 62, thereby restricting the flow out of cavity 54 and by narrowing cavity 54, the pressure in cavity 54 is increased if a fixed inlet flow is maintained. As a result, the pressure in cavity 54 is greater than the pressure in cavity 56 and an unbalanced net force is created tending to lift the disk away from cavity 54 and toward cavity 56. This effect continues until the pressures in the two cavities 54 and 56 are again equalized and disk 24 has found its equilibrium position. The same type of restoring force is created if the disk 24 is displaced in the opposite direction. The net effect is that the disk "floats" in its equilibrium position so that when the disk is caused to rotate it always has a thin film of liquid on which to ride between pairs of races 42, 48 and 44, 46 and 43, 52 and 45, 50.

By examining the fluid flow within the housing 28 it can be seen that there is a continuous circulation and exchange of liquid throughout the actuator system 10. The electromagnetic pump 76 draws off liquid sodium from cavity 70. This liquid is replenished either from the system 12 through passages 31, 66 and 68 or from cavities 54 through orifice 62, passages 66 and 68 or from cavity 56 through orifice 64 and passage 68. The pump 76 continuously delivers new supplies of liquid to cavities 54 and 56 through ducts 72 and 74.

This continuous circulation is an important factor in the operation of an actuator in a liquid sodium environment. Impurities within the liquid sodium system, namely those compounds of sodium which form by reacting with oxygen and hydrogen tend to migrate to the cooler parts of the system. When accumulation of the impurities occurs, detrimental effects are observed. The impurities formed with oxygen form hard deposits and consequently cause the fouling and eventual seizing of moving components. The impurities formed with hydrogen tend to embrittle the exposed components which leads to accelerated component failure. By providing circulation throughout the housing 28 and free exchange with the liquid sodium 16 of the system 12, the housing 28 is continuously flushed when the actuator is in operation. If the valve actuator is to remain in an inactive open position for a considerable time, the actuator may be periodically cycled from full-open to semi-open in order to provide the desired circulation and flushing action.

The rotation of the described actuator is accomplished through the rotation of the liquid sodium 16 which surrounds the vanes 26. Rotational motion of the liquid sodium is obtained through the interaction of a circularly advancing magnetic field and the liquid sodium. The circularly advancing magnetic field is created by a multitude of phased electromagnetic pole pairs 80 and 82 which are spacially situated around the top and bottom of the housing disk 28 and which are excited in a multi-phased sequence. The phasing of each successive pair of poles 80, 82 causes a pulse of magnetic field to travel around the disk. In so traveling, the constantly changing magnetic field passes through the liquid sodium 16 which occupies the space 84 normal to the plane of the hydraulic bearing vane assembly disk 24 and induces an eddy current in the liquid sodium which in turn causes forces on the sodium which make it tend to follow the traveling magnetic field by the well known principles used in the electric induction motor. The forces acting on the sodium and causing it to want to flow with the traveling magnetic field cause a pressure to be exerted on the vanes as the liquid metal tries to flow around them in the direction of travel of the magnetic field.

Figure 3:
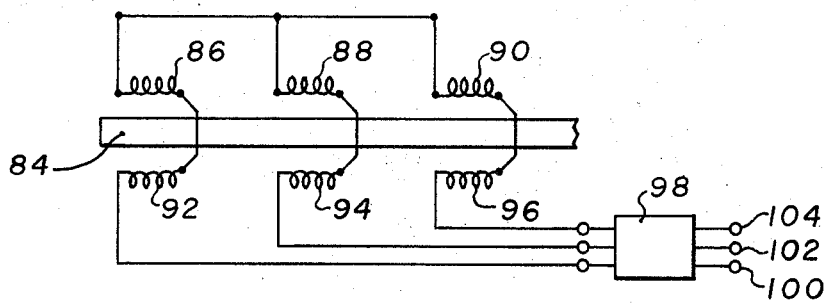
FIG. 3 is a circuit diagram showing the wiring necessary to phase successive triplets of top and bottom pairs of magnetic poles.

FIG. 3 shows the poly-phase circuit needed to excite the magnetic pole pairs 80, 82. The three phase input is represented by contacts 100, 102 and 104. Numeral 98 represents a reversing switch by means of which phasing of the magnet poles and the advancing magnetic field can be caused to travel in the opposite direction. Pairs of numerals (86, 92), (88, 94) and (90, 96) represent the pairs of windings which excite the top and bottom pairs of electromagnetic poles 80 and 82.

In order for the magnetic field to penetrate through the housing 28 and through the conducting liquid 16 the housing 28 must be made from a material which is either magnetically permeable, very thin if not magnetically permeable, or a combination of both. Type 316 stainless steel is the material best suited for containing high temperature liquid sodium. Type 316 stainless steel is not particularly permeable so that the housing 28 in the vicinity of magnetic poles 80 and 82 should be quite thin, from 30 to 60 one-thousandths of an inch in thickness. With such a thickness the housing 28 must be clad with a magnetically permeable strengthening material such as series 400 stainless steel or any of the mild carbon steels. This intermediate layer of magnetically permeable material lying between the magnetic pole faces 80, 82 and the stainless steel housing 28 provides a good magnetically conducting path for the magnetic field.

It will be understood that the embodiment shown and described herein is merely illustrative and that changes may be made without departing from the scope of the invention as claimed.

What is claimed is:

1. A valve actuator assembly driven by an electrically conducting working fluid for an electrically conducting fluid handling system, comprising:
   a. a housing;
   b. a vane assembly adapted to rotate within said housing;
   c. means suspending said vane assembly within said housing for allowing low friction rotation of said vane assembly;
   d. power delivery means operably coupled to said vane assembly for utilizing said rotation;
   e. a passage in said housing adapted to permit utilization of said rotation;
   f. a passage in said housing adapted to permit the interchange of said electrically conducting fluid within said housing with said electrically conducting fluid of said fluid handling system; and
   g. electromagnetic pumping means operating on said electrically conducting liquid surrounding said vanes for imparting a rotary motion to said liquid and thereby impelling said vane assembly into rotation.

2. An actuator assembly driven by an electrically conducting liquid as recited in claim 1 wherein said power delivery means includes:
   a. a threaded shaft movable in the direction of its axis;
   b. means suspending said shaft within said housing for allowing low friction translation of said shaft; and c. means interconnecting said vane assembly and said shaft for transforming said vane assembly's rotary motion into translation of said shaft.

3. An actuator assembly driven by an electrically conducting liquid as recited in claim 1 wherein said vane assembly includes blades extending radially outwardly and whose flat surfaces lie perpendicularly to the plane of rotation; and wherein said housing surrounding said vane assembly having essentially a hollow disk shape with said vane assembly contained in the interior; and wherein said electromagnetic pumping means includes a plurality of AC activated polyphase wound electromagnets distributed around the top and bottom surfaces of said disk shaped housing for generating a wave of magnetic field which travels in a clockwise direction around said disk shaped housing; and wherein said electromagnetic pumping means further includes an electrical means for reversing the phase of the polyphase wound electromagnets so that the wave of magnetic field travels around said disk shaped housing in a counterclockwise direction.

4. An actuator assembly driven by an electrically conducting liquid as recited in claim 1 wherein, said means for allowing low friction rotation of said vane assembly comprises:
   a. a self-balancing hydrostatic bearing; and
   b. pumping means connected to both sides of said hydrostatic bearing and to said housing by fluid passages for supplying said hydrostatic bearing with a pressurized source of liquid.

5. An actuator assembly driven by an electrically conducting liquid as recited in claim 1 wherein: said electrically conducting liquid is liquid sodium; and wherein said housing is a hermetically sealed housing hermetically sealed to said fluid handling system.

6. A valve actuator assembly for an electrically conducting liquid handling system, comprising:
   a. a hermetically sealed housing hermetically sealed to said electrically conducting liquid handling system;
   b. a vane assembly adapted to rotate in said housing, said vane assembly including blades extending radially outwardly and whose flat surfaces lie perpendicularly to the plane of rotation;
   c. means suspending said vane assembly within said housing for allowing low friction rotation of said vane assembly, said means including a self-balancing hydrostatic bearing;
   d. power delivery means operably coupled to said vane assembly for utilizing said rotation, said power delivery means including a threaded shaft movable in the direction of its axis, means suspending said shaft within said housing for allowing low friction translation of said shaft, and means interconnecting said vane assembly and said shaft for transforming said vane assembly's rotary motion into translation of said shaft;
   e. a passage in said housing adapted to utilize said rotation;
   f. a passage in said housing adapted to permit the interchange of said electrically conducting liquid within said housing with said electrically conducting liquid of said system; and
   g. electromagnetic pumping means operating on said electrically conducting liquid surrounding said vanes for imparting a rotary motion to said liquid and thereby impelling said vane assembly into rotary motion.

* * * * *